March 24, 1925.
E. SCHULTZ
CASTER BRACKET
Filed June 19, 1923
1,530,525
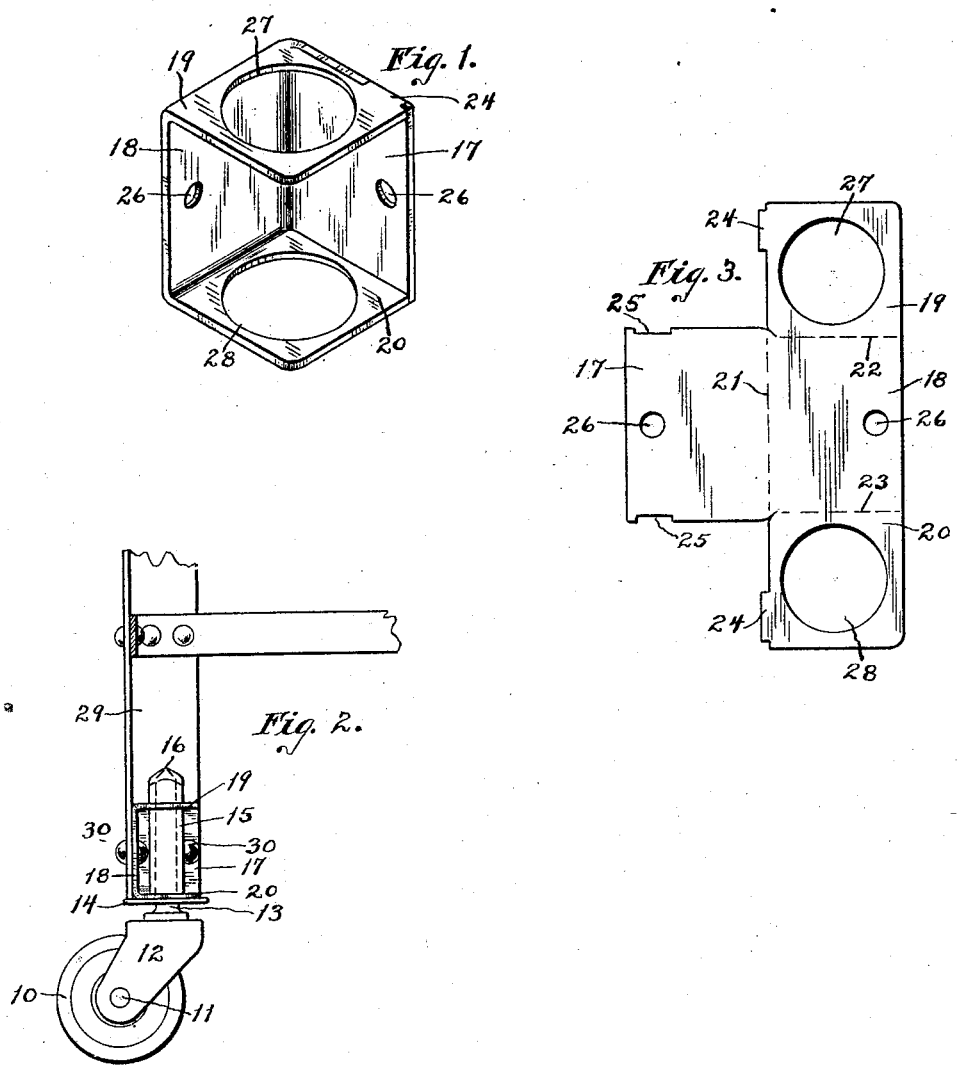
INVENTOR
EDWARD SCHULTZ
BY Earl M. Sinclair
ATTORNEY Patented Mar. 24, 1925.

1,530,525

UNITED STATES PATENT OFFICE.

EDWARD SCHULTZ, OF CHICAGO, ILLINOIS, ASSIGNOR TO JAMES B. LADD, OF DES MOINES, IOWA.

CASTER BRACKET.

Application filed June 19, 1923. Serial No. 646,470.

*To all whom it may concern:*

Be it known that I, EDWARD SCHULTZ, a citizen of the United States of America, and resident of Chicago, Cook County, Illinois, have invented a new and useful Caster Bracket, of which the following is a specification.

This invention relates to a bearing bracket by means of which a swivel caster may be attached to an object, such for instance as the angle iron leg of a washing machine, and has for its object the provision of a simple, inexpensive and efficient bracket which may be readily and quickly attached to such object.

My invention consists in the construction, arrangement and combination of element's hereinafter set forth, pointed out in my claims and illustrated by the accompanying drawing, in which—

Figure 1 is a perspective view of a bracket embodying my invention. Figure 2 is a side elevation showing one of the brackets attached to an object and in supporting relation to a swivel caster as required for practical use. Figure 3 is a plan view of the blank from which the bracket is formed.

The caster with which my improved bracket is designed to be used is composed of a roller or wheel 10 pivoted on an axle 11 extending across a fork or yoke 12 from which a stem 13 extends upwardly. At the lower end portion of the stem 13 a washer or disk 14 is supported in horizontal position, which in use is adapted to engage the lower surface of a leg or other load object which the caster assists in supporting. A spring yoke 15 extends upwardly from the disk 14 and is formed at its upper closed end with a step bearing 16 resting on the upper end of the stem 13 and providing a bearing therefor, within which and the washer said stem is adapted to swivel. The details of this caster form no part of my present invention, and it is shown and briefly described herein simply for the purpose of furnishing a basis for disclosing the function of the bracket. The caster is designed to be used in connection with a tubular leg or other load object formed with a downwardly opening socket adapted to receive the stem 13 and spring yoke 15, the latter member frictionally engaging the walls of the socket and retaining and centering the stem therein, with the washer 14 engaging the load object circumferentially of the socket therein and receiving the weight of the object for support by the caster. In the case of an object having a leg formed of a section of angle iron, as many washing machines and other domestic objects are now formed, such leg cannot well be formed with a socket to receive the caster, and it is my purpose to provide an attachment adapted to be secured to such leg to provide a bearing for the caster, serving the same purpose as a tubular opening or socket formed integrally in other articles of furniture or equipment.

The bracket may be formed from a blank of sheet steel or other suitable metal shown in Figure 3, the body portion 17—18 being of generally rectangular shape and having two substantially square end flange plates 19, 20 extending laterally therefrom at its opposite sides and having a dimension of substantially one-half that of the longer side margin of the body plate. The body portion 17—18 is adapted to be bent at right angles on the transverse line 21, thus producing two side walls at right angles to each other and designated in Figures 1 and 2 by the numerals 17 and 18. The bend on the line 21 preferably is not a sharp one but is made on a small arc. The end flanges 19, 20 are adapted to be bent to positions at right angles to the side walls 17, 18, on the broken lines 22, 23 (Figure 3) separating them from the body portion 18, whereby said end flanges are placed in spaced parallel planes, the whole device thus forming a box-like structure open on two sides. The end flanges 19, 20 are each formed on one margin with a tongue 24 adapted to be received tightly, and through the application of force, within notches 25 formed in opposite end margins of the body portion or wall 17, this connection supplementing the inherent stiffness of the metal in maintaining the bracket in its ultimate form. The body portions or side walls 17, 18 are each formed with a rivet hole 26 adjacent their free side walls. The end flanges 19, 20 are formed respectively with relatively large circular holes 27, 28, which are in axial alinement when the bracket is formed and in effect provide a cylindrical socket, or spaced bearings in the end walls of the bracket.

The device so formed is adapted to be mounted within the lower end portion of an angular member such as the angle leg 29 of a load object, preferably with the lower end of the bracket flush with the lower end of said leg. The bracket is held rigidly and permanently in place by means of rivets 30 or other securing means extending through the holes 26 and registering holes in the flanges of the leg 29. The dimensions of the side members 17, 18 preferably are such that their outer margins are flush with the margins of the flanges with which they contact and to which they are secured.

Thus a bearing bracket is provided for the caster, which bracket is of very simple and inexpensive form and is easily and quickly attachable to the load object. The caster is placed in position by upward movement of the stem and spring yoke 15 through the holes of the lower end flange 20 and upper flange 19, the diameter of the holes 27, 28 being slightly less than the normal diagonal axis of said spring yoke so that said yoke is compressed, placed under tension and caused to frictionally engage the end flanges circumferentially of said holes and prevent withdrawal of the caster accidentally.

I claim as my invention—

1. The combination of a caster having a spring yoke centering and retaining device, of a bracket comprising side plates arranged at right angles to each other, means for attaching said side plates to an object, and end flanges integrally formed on opposite ends of one of said side plates and arranged at right angles thereto, said end flanges being formed with registering holes adapted to receive said spring yoke centering and retaining device.

2. The combination of a caster having a spring yoke centering and retaining device, of a bracket comprising side plates arranged at right angles to each other, means for attaching said side plates to an angular object, and end flanges integrally formed on opposite ends of one of said side plates and arranged at right angles thereto, said flanges extending into contact with end margins of the other side plate and secured thereto, said end flanges being formed with registering holes adapted to receive said spring yoke centering and retaining device, which is adapted to be frictionally retained therein.

3. A bracket of the character described, comprising integrally formed side plates arranged at right angles to each other, and end flanges formed integrally on opposite ends of one of said plates and arranged at right angles thereto and contacting the end margins of the other side plate, the last named side plate being formed with notches in its ends, together with tongues on marginal portions of said end flanges adapted to be received within said notches.

4. A blank for a bracket, comprising a body portion of substantially rectangular form adapted to be bent on a transverse line substantially midway between its ends, and end flanges formed on one member of said body portion and adapted to be bent at right angles thereto.

5. A blank for a bracket, comprising a body portion of substantially rectangular form adapted to be bent on a transverse line, and end flanges formed on opposite sides of one member of said body portion and adapted to be bent into parallel planes at right angles thereto, said end flanges being formed with circular holes adapted to register when so bent.

Signed at Chicago, in the county of Cook and State of Illinois, this 29th day of May, 1923.

EDWARD SCHULTZ.